United States Patent [19]
Carey et al.

[11] Patent Number: 5,370,152
[45] Date of Patent: Dec. 6, 1994

[54] I/P CONVERTERS

[75] Inventors: David C. Carey; Stuart D. Stoney, both of West Yorkshire, England

[73] Assignee: Watson Smith Limited, United Kingdom

[21] Appl. No.: 849,704

[22] Filed: Mar. 11, 1992

[30] Foreign Application Priority Data

Mar. 13, 1991 [GB] United Kingdom ............ 9105341.3

[51] Int. Cl.$^5$ .................................... G05D 16/20
[52] U.S. Cl. .................... 137/487.5; 137/85; 137/116.5; 251/129.05
[58] Field of Search ............ 137/84, 85, 487.5, 116.5; 251/129.05

[56] References Cited

U.S. PATENT DOCUMENTS

| | | |
|---|---|---|
| 2,806,481 | 9/1957 | Faust . |
| 2,994,334 | 8/1961 | Loveless . |
| 3,240,223 | 3/1966 | Horst . |
| 3,369,561 | 2/1968 | Zimmerman et al. . |
| 4,509,547 | 4/1985 | Smith et al. . |
| 4,705,067 | 10/1987 | Coffee ...................... 137/487.5 |
| 4,722,360 | 2/1988 | Odajima et al. . |
| 4,898,200 | 2/1990 | Odajima et al. . |
| 4,951,705 | 8/1990 | Carey et al. . |

FOREIGN PATENT DOCUMENTS

| | | |
|---|---|---|
| 0046287 | 2/1982 | European Pat. Off. . |
| 0057581 | 8/1982 | European Pat. Off. . |
| 0341861 | 4/1989 | European Pat. Off. . |
| 3601907 | 7/1986 | Germany . |
| 3542705 | 8/1986 | Germany . |
| 3800654 | 7/1989 | Germany . |
| 1185709 | 3/1970 | United Kingdom . |
| 2128372 | 4/1984 | United Kingdom . |
| 2165372 | 4/1986 | United Kingdom . |
| WO8001826 | 9/1980 | WIPO . |
| WO8101475 | 5/1981 | WIPO . |

Primary Examiner—Robert G. Nilson
Attorney, Agent, or Firm—Cushman, Darby & Cushman

[57] ABSTRACT

A fail-safe, precision current-to-pressure converter for providing a regulated pneumatic output pressure proportional to an electrical control current includes a main valve member for regulating the pneumatic output pressure, operation of the valve member being controlled by the pressure of control fluid contained in a chamber. The control fluid pressure is controlled by admitting control fluid into the chamber via a continuously pulsed, electromagnetically actuated on/off reed valve and simultaneously allowing control fluid continuously to exhaust to atmosphere via a fixed bleed orifice, the rate of admittance of control fluid into the chamber relative to the exhaust rate from the orifice being variable so that the desired, substantially constant output pressure, as dictated by the electrical current input and as measured by a transducer that produces a feed-back signal, will be attained. In the event that the input current fails, the valve remains closed and continued exhaust of control fluid from the chamber causes the control fluid pressure, and therefore the output pressure, to fall to atmospheric pressure, ie the converter fails to "zero" in such event. Because of its relatively simple design, a converter of the invention is somewhat more rugged and less expensive to manufacture than prior I/P converters.

5 Claims, 3 Drawing Sheets

I/P CONVERTERS

BACKGROUND OF THE INVENTION

This invention relates to electro-pneumatic converters (sometimes called electro-pneumatic "regulators") and has particular reference to such converters commonly referred to as I/P ("I to P") converters.

I/P converters are used to control pneumatic pressure—usually of compressed air—in response to the electrical output of an electronic control source. The common industry standard for the electronic control source is that the output current should preferably vary in the range 4–20 mA with 4 mA corresponding to minimum pressure and 20 mA to maximum pressure.

Electro-pneumatic converters may either fail to zero (otherwise called "fail safe") when the current is, for whatever reason, cut off, or may fail to a freeze condition or to another pressure predetermined by the user. In a fail to zero converter, with which the invention is particularly, but not exclusively, concerned the absence of current results in the pressure in the output line falling to a low, typically atmospheric pressure.

THE PRIOR ART

Two-wire fail to zero I/P converters, ie converters that are powered and controlled solely by the electrical signal produced by electronic apparatus, are known in which the electrical power operates an electromagnet to balance pneumatic pressure so as to regulate pressure. A typical example of such a converter is the Watson Smith I/P Converter Type 100, available from Watson Smith Limited, of Cross Chancellor Street, Leeds, England. Although such I/P converters are very accurate, they are somewhat fragile and difficult to make.

It is an object of the present invention to provide an I/P converter, preferably a fail to zero, or to a pre-determined relatively low pressure, I/P converter and preferably of the two-wire type, that is somewhat more rugged and cheaper to make than prior I/P converters.

SUMMARY OF THE INVENTION

According to one aspect of the present invention, therefore, there is provided an I/P converter operable response to an electrical current input to provide a linearly or otherwise proportionate output pressure, said converter comprising:
a) an inlet for a fluid, for example compressed air, whose output pressure is to be regulated;
b) an outlet for said fluid at said output pressure;
c) a passageway interconnecting said inlet and outlet;
d) a valve seat in said passageway;
e) a moveable valve element co-operable with said valve seat and operable by the pressure of a control fluid contained in a chamber, the pressure of said control fluid being variable in response to said electrical input current-whereby the output pressure will be proportionate to said electrical input current;
f) a bleed connected to said chamber from which control fluid can continuously exhaust in controlled manner during normal operation of the converter;
g) an electrically operated, continuously pulsed on/off switching valve connected to said chamber for admitting control fluid into said chamber so as to maintain the average pressure of the control fluid at a desired value in dependance upon the value of said electrical input current;
h) a pressure transducer for producing a signal related to said output pressure; and
i) electrical circuitry for controlling said electrically operated valve in response to a comparison between said input current and the signal produced by said pressure transducer, thereby to bring the pressure of the control fluid to said desired value;
whereby in the event of failure of said electrical input current, the electrically operated valve connected to said chamber will close but fluid in the chamber will continue to exhaust through said bleed until it has reached a pre-determined lower value, for example atmospheric pressure, whereby said output pressure will eventually assume a lower value, for example atmospheric pressure.

Preferably, a converter of the invention will be operable by an electrical input current within the range of about 4 to 20 mA, as mentioned earlier, with an input of about 4 mA corresponding to the minimum output pressure of the converter and about 20 mA to its maximum output pressure. Accordingly, in the case of a two-wire system, the electrical circuitry should be able to be driven by an input current within that range, as should the electrically operated valve. By "on/off switching valve" as used herein, we mean a valve having substantially only two states, namely fully open and fully closed, there being a rapid transition between the two states. As already stated, the valve is continuously pulsed during use of the converter. The pulse frequency will typically be of the order of eg 10 Hz. Thus, for example, the on/off switching valve is preferably a reed-type of valve, for example a REEDEX valve (trade mark) as supplied by our sister company, Norgren Co of the USA, or other low current drain on/off switching valve such as a piezoelectric valve.

The bleed may simply be a fixed opening, in, or connected by a pipe to, the chamber, the opening having a pre-determined cross-sectional area whereby the continuous rate of exhaust of fluid from the chamber may be pre-determined at any given control fluid pressure. By way of example, the opening may be a circular hole or restrictor having a diameter of about 0.15 mm. In that case, the I/P converter would fail to "zero" in the event of failure of the electrical input current. Alternatively, for example, the bleed may include a limiting valve arranged to permit control fluid to exhaust continuously from the chamber when its pressure is above a pre-determined value, but to close when the pressure in the chamber has reduced to that value pursuant to a fail condition; then the converter would be classed as a "fail to pre-determined pressure" converter, being a pressure above atmospheric pressure but generally lower than the normal working output pressure range of the converter.

The invention will now be described in more detail, by way of example only, with reference to the accompanying drawings.

DESCRIPTION OF THE PREFERRED EMBODIMENT

Figure 1:
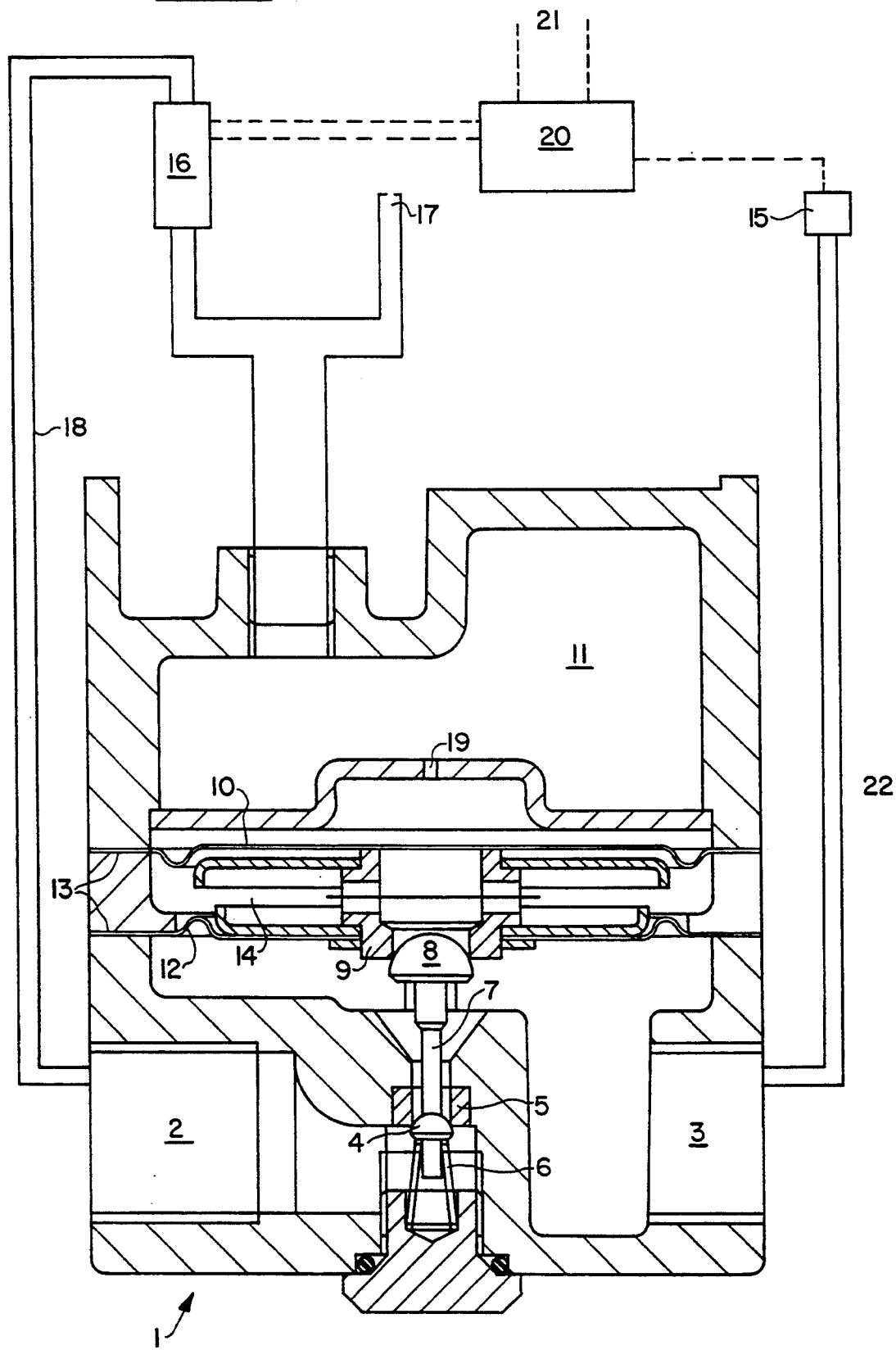
FIG. 1 is a schematic, part sectional view of a two-wire I/P converter constructed in accordance with the invention.

Referring to FIG. 1, this shows an I/P converter in accordance with the invention in which there is provided on the pneumatic side a pressure regulator generally indicated by 1, which is of fairly conventional form. The pressure regulator includes an inlet 2 and an outlet 3 with the flow of compressed air or other pneumatic fluid between the inlet and the outlet being influenced by the position of a valve member 4 mounted in valve seat 5. A spring 6 normally holds the valve member 4 in the closed position. The valve member 4 is connected via push rod 7 to a domed head 8 which co-operable with an annular seating member 9. The annular seating member 9 contacts the underside of diaphragm 10, to the upper surface of which pressure in a control volume (chamber) 11 is transmitted. A lower diaphragm 12 is connected to the annular member 9. Both diaphragms 10 and 12 are sealed around their peripheries at 13. Between the two diaphragms 10 and 12 is an air space 14 which is connected to atmosphere.

It can be seen that if the valve 4 is moved in a downward direction as shown in the drawing, high pressure air in the inlet 2 will pass into the outlet 3. As the valve 4 rises, the flow of air through the valve formed between 4 and 5 is throttled to control the pressure in the outlet 3. Since the annular ring 9 is a solid member, it can be seen therefore that by controlling the position of diaphragm 10, the output pressure in 3 can be controlled. In fact, there is a fixed relationship between the pressure in the control volume 11 and the output pressure in the outlet 3. If the pressure in the outlet 3 is raised so that the upward force exerted by the output pressure on the diaphragm 12 exceeds the downward force exerted by the pressure in control volume 11 on diaphragm 10 then both diaphragms 10, 12 move upwards carrying with them annular member 9 and releasing air along the domed member 8 and out through chamber 14 to atmosphere.

Thus by controlling the pressure in the control volume 11, accurate control of the outlet pressure in 3 is provided.

The outlet pressure in 3 is accurately monitored by a piezoresistive (or other electronic, eg capacititive) pressure transducer 15 which is connected to the outlet pressure by any suitable means shown schematically by pipe 22. Thus, the pressure transducer 15 produces a signal which is directly related to the outlet pressure of the regulator. Equally, the transducer could respond to pressure in the control volume 11 which of course is related to the outlet pressure in 3.

The actual pressure in the control volume 11 is controlled by a reed valve 16 and a restricted, open outlet 17. Suitable reed valves are REEDEX valves available from Watson Smith Limited. The REEDEX valve is an electro-pneumatic valve which has two magnetic reeds, one fixed and one flexible set a small distance apart in a moulded plastic body. Application of a magnetic field in line with the reed from a magnetic coil induces attraction between the reeds, causing the flexible one to deflect until it touches the fixed one. As the flexible reeds move, an elastomer seal bonded to it either uncovers an orifice allowing a flow to occur (normally closed version) or shuts off the flow (normally open version).

Removal of the magnetic field by disconnection of the electrical source allows the reed to relax, shutting off flow in the normally closed version and allowing it to occur in the normally open version.

The power consumption of an electro-pneumatic REEDEX valve is about 500 mW during opening, but only about 40 mW to hold it in the open position.

The reed valve 16, which is of the normally closed version, is connected to inlet pressure by any suitable means shown schematically by pipe 18. The outlet 17 simply goes to atmosphere. Both the valve 16 and the outlet 17 are connected to the control volume 11 which transmits pressure to the upper surface of the diaphragm 10 via an orifice 19.

Figure 2:
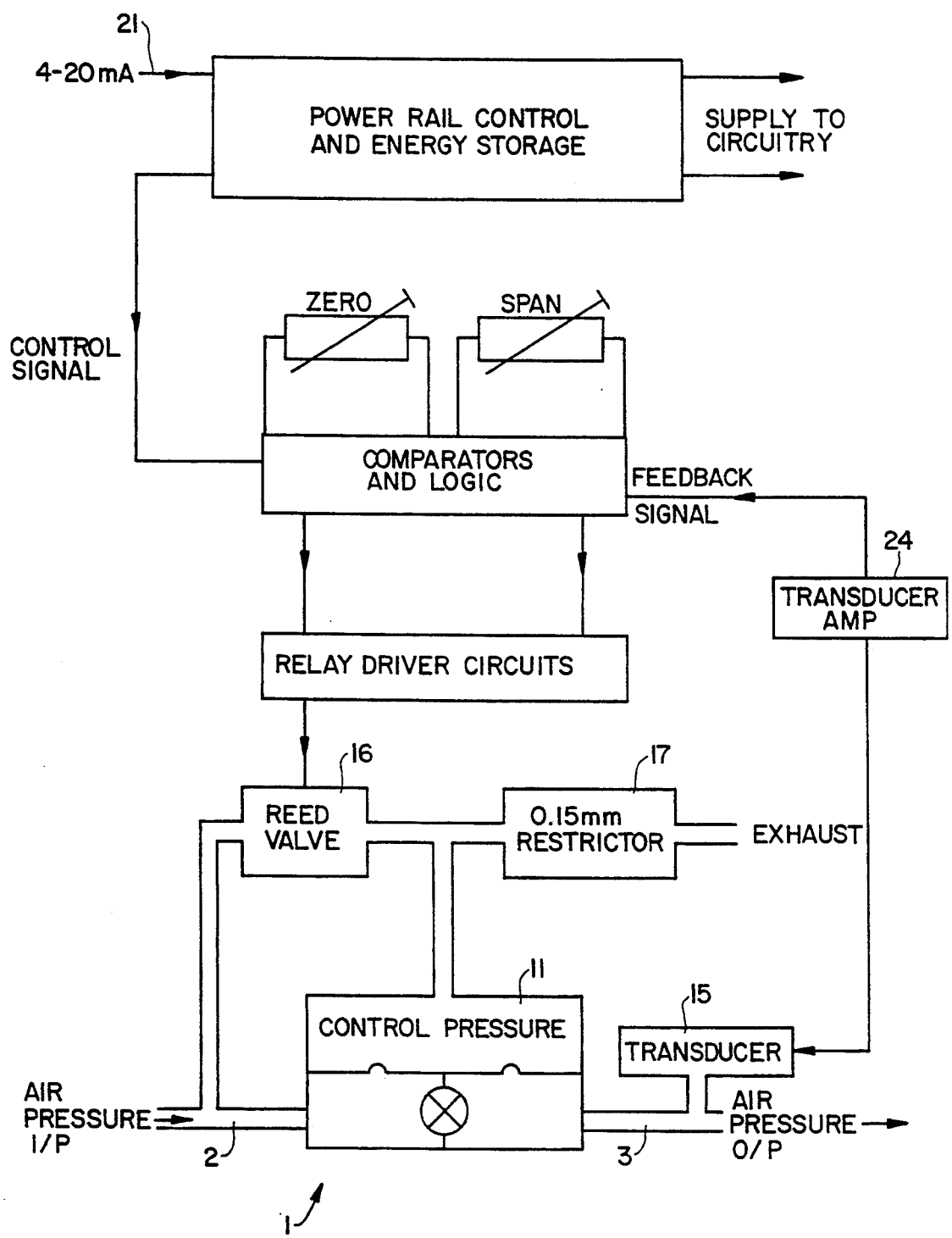
FIG. 2 is a schematic block diagram of the various functions of a two-wire I/P converter constructed in accordance with the invention.
Figure 3:
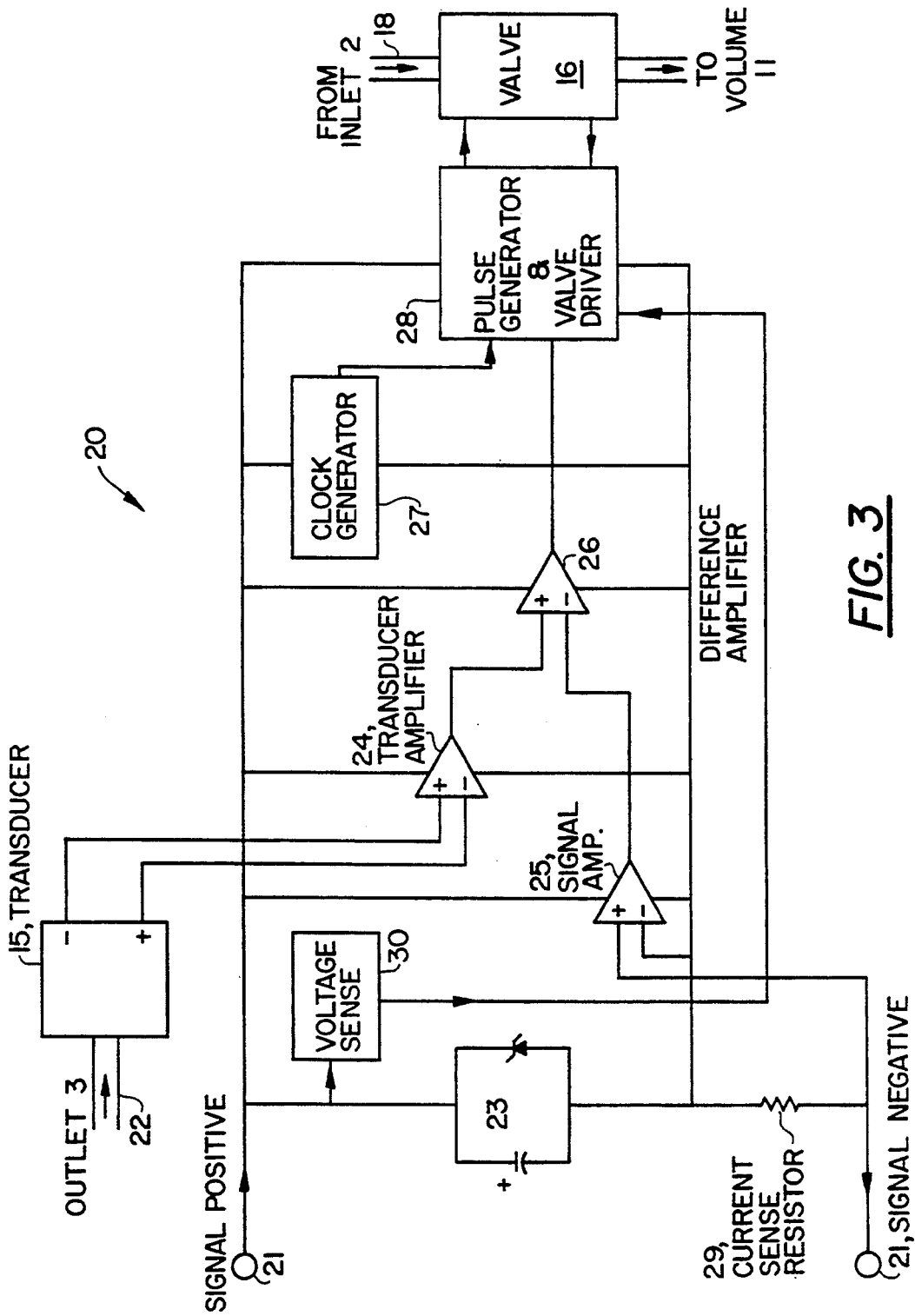
FIG. 3 is a schematic diagram of the electrical circuitry of a two-wire I/P converter constructed in accordance with the invention.

The converter is controlled by an electronic circuit 20, shown, in block form, in FIG. 2 and in more detail in FIG. 3, which is powered by, and is responsive to, an electrical current input shown at 21 fed to the converter by two wires.

Under steady state conditions, ie when the desired pressure in the control volume 11 has been established, the amount of air supplied through the valve 16 exactly balances that lost through the bleed 17 thus maintaining a constant average pressure in the control volume 11 and hence at the outlet 3 (the outlet pressure).

In order to raise the pressure at the outlet 3, in response to an increased control current 21, the opening time of the valve 16 is lengthened so that the amount of air entering the control volume 11 exceeds that lost through the outlet 17. Thus the average pressure in the control volume 11 increases and the pressure at the outlet 3 increases accordingly. On the other hand, in order to lower the pressure at the outlet 3, in response to a reduced control current 21, the opening time of the valve 16 is shortened so that the air supplied to the control volume 11 is less than that lost through the outlet 17; thus the average pressure in the control volume 11 decreases and the pressure at the outlet 3 decreases accordingly.

Reference is now made to FIG. 3 of the drawings.

The input current signal 21 passes through the storage and regulation elements 23 thus providing a substantially constant voltage power supply for the electronic circuitry. This input current also passes through a current sensing resistor 29 which provides a voltage proportional to this signal which is amplified in a signal amplifier 25.

The signal from the pressure transducer 15 is amplified by a transducer amplifier 24 which contains potentiometers to control its gain and offset for the purposes of calibrating the instrument.

A difference amplifier 26 produces a difference signal which is proportional to the difference between the output of the signal amplifier 25 and the output of the transducer amplifier 24.

A pulse generator 28 is only capable of producing one pulse during each period of a clock generator 27. The duration of this pulse depends on the amplitude and polarity of the signal from the difference amplifier 26. If the transducer amplifier 24 output is greater than that of the signal amplifier 25 then no pulse is produced and the valve 16 remains closed. This allows the pressure at the outlet 3 to fall as described above.

On the other hand if the transducer amplifier 24 output is less than that of the signal amplifier 25 then a pulse is produced which is proportional to the difference. Whether the average pressure in the control volume 11 increases, remains steady or decreases depends on the width of this pulse. With a given, steady input current signal 21 the pressure at which the outlet 3 is maintained is that at which the above difference signal causes a pulse width which opens the valve 16 sufficient to allow air to enter volume 11 at the same average rate with which it leaves through the outlet 17.

When a signal current 21 is first applied to the instrument the storage capacitor comprised in 23 has insufficient charge to operate the valve 16 and must be allowed to charge to a minimum voltage before an attempt is made to open the valve. A voltage sensing circuit 30 detects this minimum voltage and inhibits the action of the pulse generator 28 until an adequate voltage is available. Once the capacitor has initially charged there will be sufficient energy in the input signal current 21 to operate the circuit continuously.

The converter specifically described above is a relatively simple, reliable and shock-proof, but nevertheless precision, converter that, compared with prior I/P converters of the fail-safe type, is relatively cheap to produce and is tolerant to wear and air leakages that might arise in service. Further, whilst there is a continuous bleed of air from the converter, this can be made relatively small, typically, for example, about 300 cc per minute which is, to our knowledge, significantly lower than competitive I/P converters on the market.

As will be appreciated a fail to zero converter constructed in accordance with the invention as defined above, may be readily adapted into a "fail to maximum" I/P converter by continuously admitting fluid into the control volume in a controlled manner and exhausting it from the chamber through an outlet via a continuously pulsed on/off valve. In other words, such a converter may be realised effectively by, with reference to FIG. 1, transposing items 16 and 17 and adapting the electronics accordingly, Thus, if the valve 16 is a normally closed one, in the event of failure of the control signal current the pressure in the control volume, and therefore the output pressure, will attain its maximum value. The present invention therefore also provides, in a second aspect, a fail to maximum I/P converter comprising such an adapted fail to zero I/P converter.

What we claim is:

1. An electro-pneumatic converter operable in response to an electrical current input to provide a regulated fluid output pressure that is linearly or otherwise proportionate to said electrical current input, the converter comprising:
   a) an inlet for fluid whose output pressure is to be regulated;
   b) an outlet for said fluid at said regulated output pressure;
   c) a passageway interconnecting said inlet and said outlet;
   d) a valve seat in said passageway; and
   e) a moveable valve element co-operable with said valve seat and operable by the pressure of a control fluid contained in a chamber, the pressure of said control fluid being variable in response to said electrical current input whereby the output pressure will be proportionate to said current input;
   f) a bleed connected to said chamber from which said control fluid can continuously exhaust to atmosphere in controlled manner during normal operation of the converter;
   g) an electrically operated, continuously pulsed on/off switching valve connected to said chamber for admitting control fluid into the chamber so as to maintain the average pressure of the control fluid at a desired value in dependance upon the value of said electrical current input;
   h) a pressure transducer for producing a signal related to said output pressure; and
   i) electrical circuitry for controlling said on/off switching valve in response to a comparison between said current input and the signal produced by the transducer, thereby to bring the pressure of the control fluid to said desired value;

whereby in the event of failure of said current input, the on/off switching valve will close and fluid in the chamber will continue to exhaust through said bleed until it has reached a pre-determined lower value, whereby said output pressure will eventually assume a correspondingly lower pressure.

2. A converter according to claim 1 wherein said bleed is a fixed opening of pre-determined cross-sectional area permanently communicating the interior of the chamber with atmosphere, whereby said output pressure will fail to "zero" in the event of failure of the electrical current input.

3. A converter according to claim 1 wherein said on/off valve is an electro-magnetically operated on/off reed valve.

4. A converter according to claim 1 which is controllable by a current input within the range of from about 4 mA to 20 mA, an input of about 4 mA corresponding to the minimum output pressure of the converter and an input of about 20 mA corresponding to the maximum output pressure of the converter.

5. A converter according to claim 4 which is operable and controllable by a two wire input and accordingly wherein said electrial circuitry and said valve can be powered by a current input within the aforesaid range.

* * * * *